United States Patent [19]

Seki et al.

[11] Patent Number: 4,855,921

[45] Date of Patent: Aug. 8, 1989

[54] COMPLEX CURVED SURFACE CREATION METHOD

[75] Inventors: Masaki Seki; Norihisa Amano, both of Tokyo, Japan

[73] Assignee: Fanuc Ltd., Minamitsuru, Japan

[21] Appl. No.: 57,939

[22] PCT Filed: Sep. 12, 1986

[86] PCT No.: PCT/JP86/00470

§ 371 Date: May 18, 1987

§ 102(e) Date: May 18, 1987

[87] PCT Pub. No.: WO87/01831

PCT Pub. Date: Mar. 26, 1987

[30] Foreign Application Priority Data

Sep. 17, 1985 [JP] Japan .................. 60-204628

[51] Int. Cl.$^4$ .................................................. G06F 15/46
[52] U.S. Cl. ............................ 364/474.29; 364/474.25
[58] Field of Search ........................ 364/167–171, 364/191–193, 474, 475; 318/568

[56] References Cited

U.S. PATENT DOCUMENTS

| | | | |
|---|---|---|---|
| 4,491,906 | 1/1985 | Kishi et al. | 364/191 |
| 4,523,270 | 6/1985 | Kishi et al. | 364/191 |
| 4,546,427 | 10/1985 | Kishi et al. | 364/168 |
| 4,569,014 | 2/1986 | Kishi et al. | 364/191 |
| 4,589,062 | 5/1986 | Kishi et al. | 364/168 |

*Primary Examiner*—John R. Lastova
*Attorney, Agent, or Firm*—Staas & Halsey

[57] ABSTRACT

This invention relates to a method of creating a complex curved surface (100) by combining at least first and second three-dimensional curved surfaces (101, 102), which method includes a step of inputting data for specifying first and second three-dimensional curved surfaces (101, 102), a step of obtaining coordinates of a j-th point Q(i,j) along an i-th path L$_c$(i), where the second three-dimensional curved surface (102) is defined by a set of plural paths, a step of determining, with regard to the first three-dimensional curved surface (101), whether the point Q(i,j) is on the same side as a (j−1)th point Q(i,j−1) along the i-th path, a step of storing the point Q(i,j) if it is on the same side and, if it is not on the same side, obtaining and storing the coordinates of a point S(i,j) on the first three-dimensional curved surface (101) corresponding to a projected point obtained by projecting the point Q(i,j) on a predetermined plane, and thereafter executing similar processing upon performing the operation j+1→j and obtaining position data indicative of the next point Q(i,j) on the i-th path, obtaining a point on the complex curved surface (100) corresponding to the i-th path, and creating the complex curved surface by a set of these points.

7 Claims, 7 Drawing Sheets

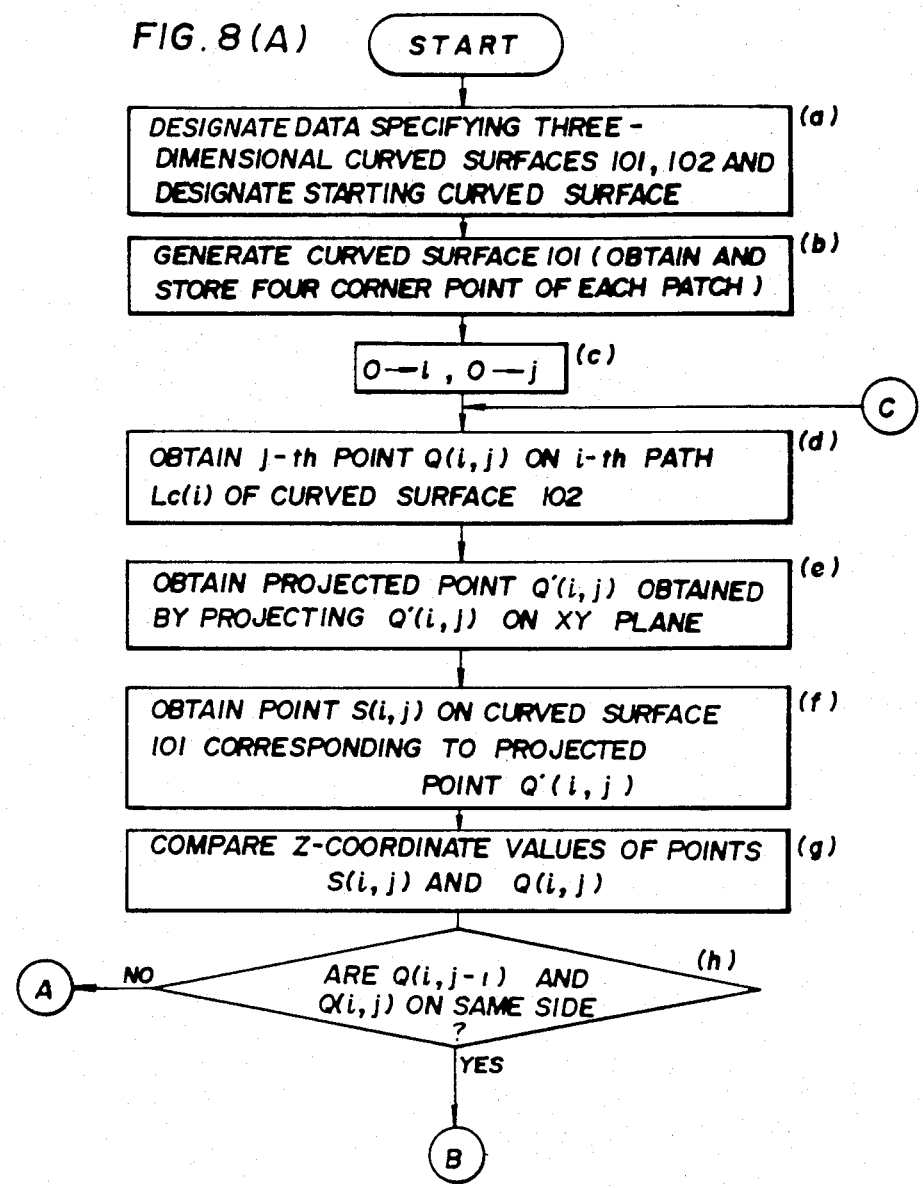

COMPLEX CURVED SURFACE CREATION METHOD

BACKGROUND OF THE INVENTION

1. Field of the Invention

This invention relates to a method of generating a complex curved surface and, more particularly, to a method of generating a complex curved surface by combining at least two three-dimensional curved surfaces.

2. Description of the Related Art

A curved surface of a three-dimensional metal mold or the like on a design drawing is generally expressed by a plurality of section curves, but no profile data is shown for the shape of the area lying between a certain section curve and the next adjacent section curve. In numerically controlled machining it is essential that machining be carried out so as to smoothly connect these two section curves despite the fact that the profile between them is not given. In other words, this means that machining must be performed by generating the curved surface between the two section curves from such data as that indicative of the section curves, storing on an NC tape the data concerning the generated curved surface, and carrying out machining in accordance with commands from the NC tape. To this end, there has been developed and put into practical use a method comprising generating a plurality of intermediate sections in accordance with predetermined rules using data specifying a three-dimensional curved body, finding a section curve (intermediate section curve) on the curved body based on the intermediate sections, and generating a curved surface of the three-dimensional body based on the plurality of generated intermediate section curves. (For example, see U.S. Pat. No. 4,491,906).

Depending upon machining, there are cases where it is necessary to machine a complex curved surface obtained by combining two or more three-dimensional curved surfaces.

In such complex curved surface creation, it is necessary to specify the complex curved surface by adopting the intersection between three-dimensional curved surfaces as a boundary, using a first curved surface as one side of the complex curved surface, and using a second curved surface as the other side of the complex curved surface.

However, since specifying the intersection is difficult in complex curved surface creation processing of this kind, a complex curved surface cannot be created accurately through simple processing.

Summary of the Invention

Accordingly, an object of the present invention is to provide a complex curved surface creation method through which a complex curved surface obtained by combining two or more three-dimensional curved surfaces can be created in accurate fashion.

Another object of the present invention is to provide a novel complex curved surface creation method through which it is possible to specify a boundary line between three-dimensional curved surfaces of a complex curved surface obtained by combining two or more three-dimensional curved surfaces.

The present invention relates to a method of creating a complex curved surface by combining at least first and second three-dimensional curved surfaces. The method of creating a complex curved surface includes a step of inputting data for specifying first and second three-dimensional curved surfaces, a step of obtaining position data indicative of a j-th point $Q(i,j)$ along an i-th path, where the second three-dimensional curved surface is defined by a set of plural paths generated using the first-mentioned data, a step of determining, with regard to the first three-dimensional curved surface, whether the point $Q(i,j)$ is on the same side as a $(j-1)$th point $Q(i,j-1)$ along the i-th path, a step of storing the point $Q(i,j)$ if it is on the same side and, if it is not on the same side, obtaining and storing the coordinates of a point $S(i,j)$ on the first three-dimensional curved surface corresponding to a projected point obtained by projecting the point $Q(i,j)$ on a predetermined plane, and thereafter executing similar processing upon performing the operation $j+1 \rightarrow j$ and obtaining position data indicative of the point $Q(i,j)$ on the i-th path, obtaining a point on the complex curved surface corresponding to the i-th path, and creating the complex curved surface by a set of these points.

BRIEF DESCRIPTION OF THE DRAWINGS

FIGS. 8A–8B are a flowchart of processing according to another aspect of the invention.

DESCRIPTION OF THE PREFERRED EMBODIMENTS

Figure 1:
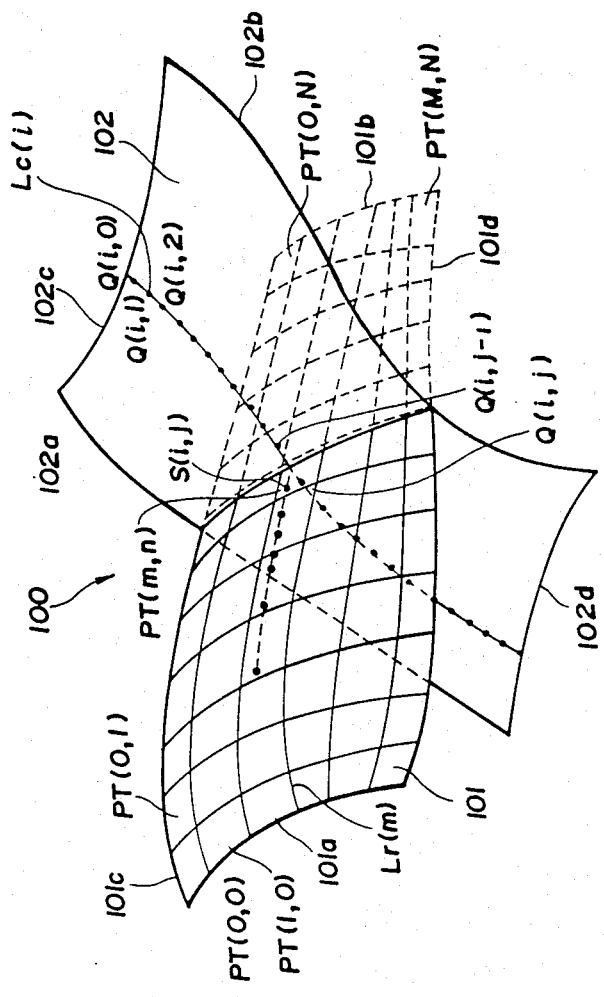
FIG. 1 is a view for describing the general features of the present invention.

FIG. 1 is a view for describing the general features of a complex curved surface creation method according to the present invention.

Numeral 100 denotes a complex curved surface, 101, 102 first and second curved surfaces, 101a, 101b operating curves of the first curved surface, 101c, 101d base curves of the first curved surface, 102a, 102b operating curves of the second curved surface, 102c, 102d base curves of the second curved surface, PT(m,n) a patch on the first curved surface, $L_c(i)$ an i-th path on the second curved surface, $Q(i,j)$ a point on the i-th path, and $S(i,j)$ a point on the first curved surface corresponding to a projected point obtained by projecting $Q(i,j)$ on a predetermined plane.

First and second data (e.g. operating curve data, base curve data) specifying the first and second three-dimensional curved surfaces 101, 102 are inputted, and these data are used to divide at least the first three-dimensional curved surface 101 into patches PT(i,j) comprising a number of very small quadrilaterals.

When the second three-dimensional curved surface 102 is defined by a set of plural paths $L_c(i)$ (i=1, 2, ...) generated using the second data, position data indicative of a j-th point $Q(i,j)$ along an i-th path $L_c(i)$ are obtained. A check is performed, with regard to the first three-dimensional curved surface 101, as to whether the point $Q(i,j)$ is on the same side as a $(j-1)$th point $Q(i,j-1)$ along the i-th path.

If Q(i,j) is on the same side, this point is stored. If it is not on the same side, the coordinates of the point S(i,j) on the first three-dimensional curved surface 101 corresponding to a projected point, which is obtained by projecting the point Q(i,j) on a predetermined plane (e.g. the X-Y plane), is obtained and stored.

Thereafter, similar processing is executed upon performing the operation j+1→j and obtaining position data indicative of the next point Q(i,j) on the i-th path $L_c(i)$, and the complex curved surface is defined by finding points on the complex curved surface corresponding to the i-th path.

Figure 2:
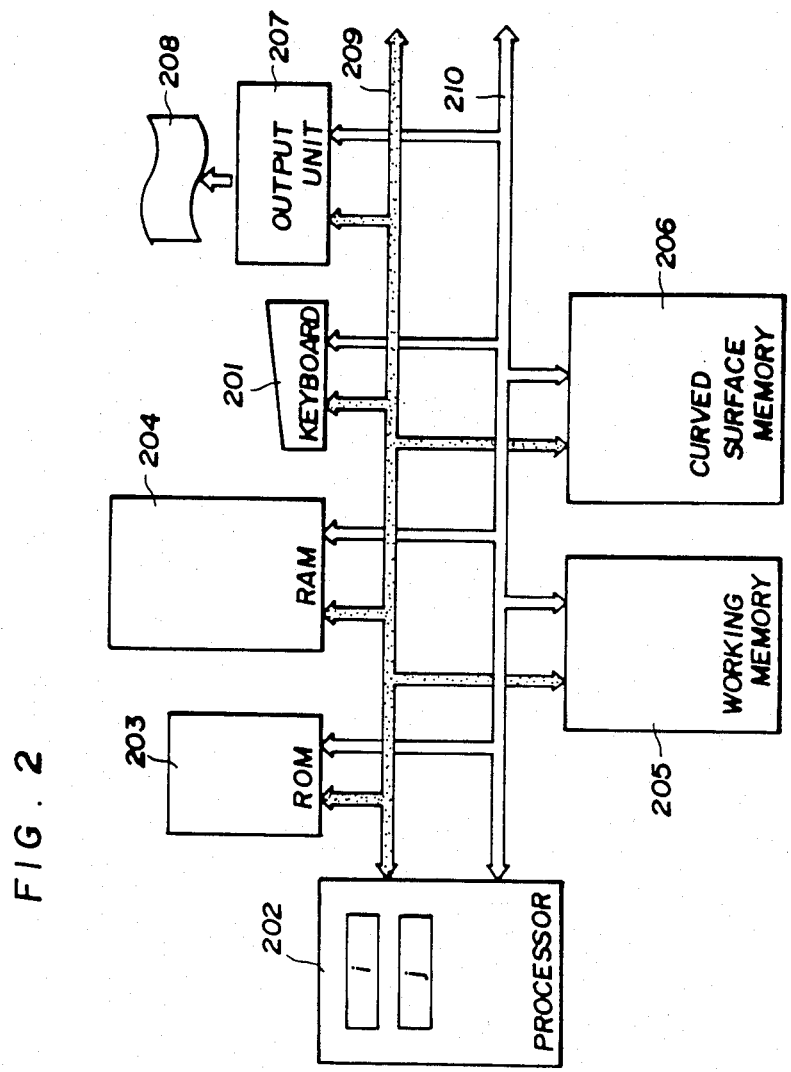
FIG. 2 is a block diagram of an embodiment of the present invention.
Figure 3:
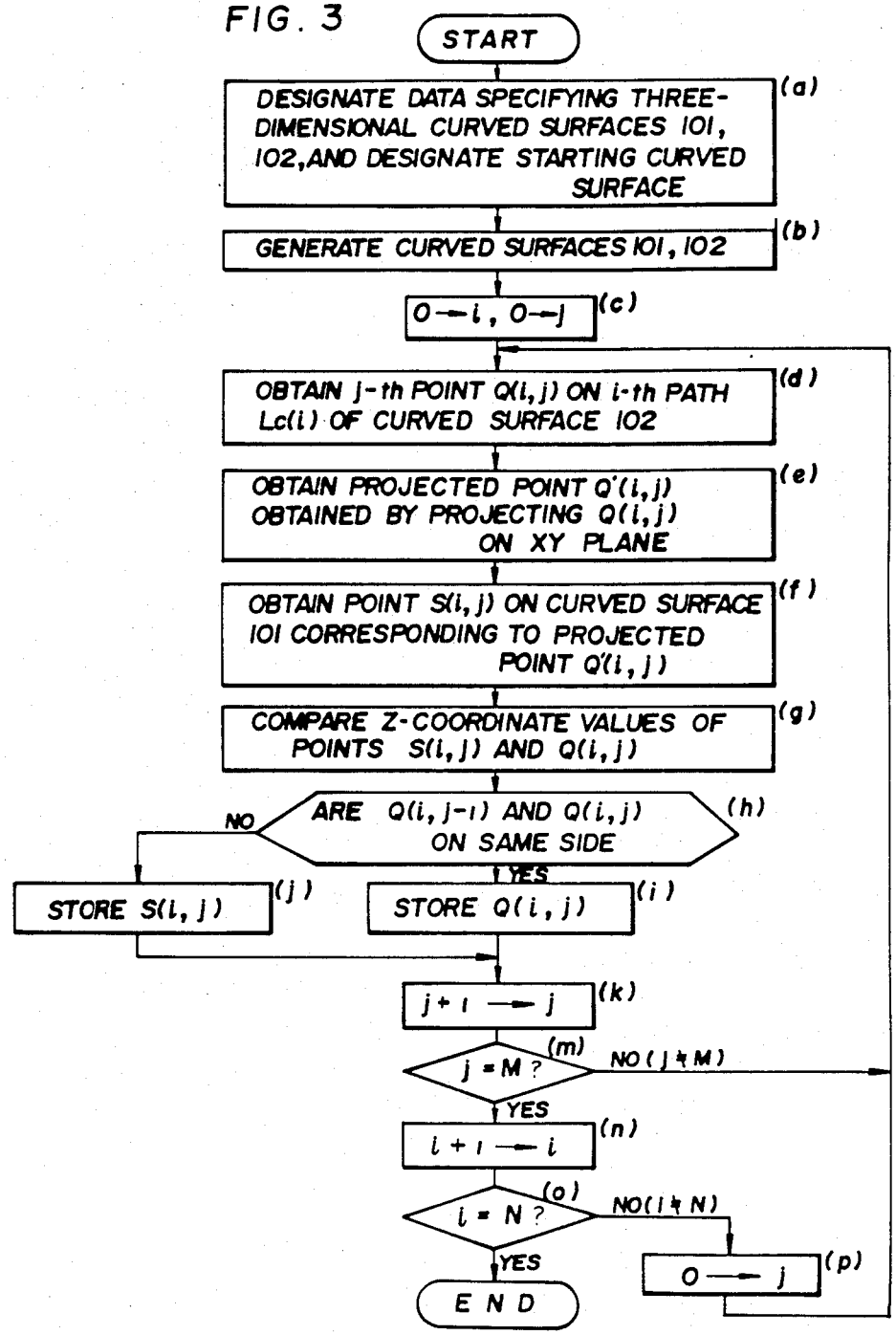
FIG. 3 is a flowchart of processing according to the invention.

FIG. 2 is a block diagram of an embodiment of the invention, and FIG. 3 is a flowchart of processing. In FIG. 2, numeral 201 denotes a keyboard for data input, 202 a processor, 203 a ROM storing a control program, 204 a RAM, and 205 a working memory. Numeral 206 designates a curved surface memory for storing curved surface data indicative of a generated complex curved surface, 207 an output unit for outputting curved surface data indicative of a generated complex curved surface, or NC program data for curved surface machining, to an external storage medium 208 such as a paper tape or magnetic tape, 209 an address bus, and 210 a data bus.

Processing for creating a complex curved surface in accordance with the present invention will now be described.

(a) First, data are entered from the keyboard 201 specifying the first and second three-dimensional curved surfaces 101, 102, and the keyboard is used to designate a starting curved surface necessary for generating a complex curved surface. These inputted data are stored in the RAM 204. The three-dimensional curved surfaces 101, 102 are specified by e.g. operating curves 101a, 101b (102a, 102b) and base curves 101c, 101d (102c, 102d), etc. Each of the three-dimensional curved surfaces 101, 102 is specified by entering these curve data and the like.

Figure 4:
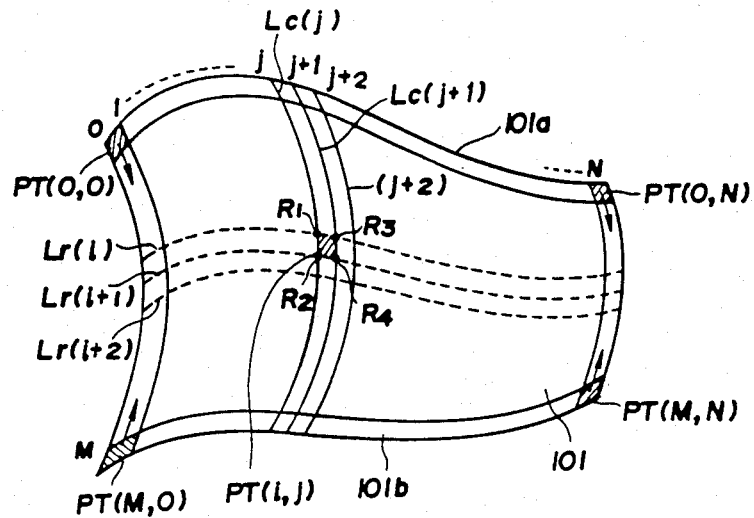
FIG. 4 is a view for describing a patch.

(b) When these data have been entered, the processor 202 generates the first and second three-dimensional curved surfaces 101, 102 by a well-known method (for example, see U.S. Pat. No 4,491,906). In processing for creating a curved surface, intermediate section curves $L_c(j)$ (j=0, 1, 2, ... N) shown in FIG. 4 are generated and the surface is created by a set of these intermediate section curves $L_c(j)$.

With regard to the first curved surface 101, let $L_c(j)$ express an intermediate section curve containing a j-th dividing point on the base curve 101 (FIG. 4), and let $L_r(i)$ express a curve obtained by connecting an i-th dividing point on each of the intermediate section curves $L_c(j)$ (j=0, 1, 2, ... N). A quadrilateral bounded by curves $L_c(j)$, $L_c(j+1)$, $L_r(i)$ and $L_r(i+1)$ is expressed as a patch PT (i, j). The four vertices R1, R2, R3, R4 of each patch PT (i, j) (i=0—N, j=0—M) are generated by the above-described curved surface creation processing and are stored in the curved surface memory 206.

(c) When the processing for generating the first and second curved surfaces ends, the processor 202 performs the following operations:

0→i, 0→j (d) Thereafter, the j-th point Q(i,j) on the i-th path $L_c(i)$ of the starting curved surface (let this be curved surface 102) designated in step (a) is obtained.

(e) Next, the coordinates of the projection Q'(i,j) (see FIGS. 5 and 6) of the point Q(i,j) on the X-Y plane are obtained. If the three-dimensional coordinates of the point Q(i,j) are (x,y,z), then the coordinates of the projected point Q'(i,j) are (x,y).

(f) The processor 202 follows this by finding the coordinates of point S(i,j) on the first curved surface 101, the coordinate of which on the X-Y plane are (x,y). The method of calculating the point S(i,j) will be described later.

(g) The heights of the points Q(i,j) and S(i,j) along the Z axis are compared and the height relationship is stored in memory.

(h) The processor 202 then determines whether the height relationship between the Z coordinate $ZQ_j$ of the point Q(i,j) and the Z coordinate $ZS_j$ of the point S(i,j) coincides with the height relationship between the Z coordinate $ZQ_{j-1}$ of point Q(i,j-1) and the Z coordinate $ZS_{j-1}$ of point S(i,j-1).

If $ZQ_j \geq ZS_j$, $ZQ_{j-1} \geq ZS_{j-1}$ or $ZQ_j < ZS_j$, $ZQ_{j-1} < ZS_{j-1}$ hold, then a decision is rendered to the effect that the points Q(i,j−1), Q(i,j)j lie on the same side in relation to the first curved surface 101. If $ZQ_j \geq ZS_j$, $ZQ_{j-1} < ZS_{j-1}$ or $ZQ_j < ZS_j$, $ZQ_{j-1} \geq ZS_{j-1}$ hold, then a decision is rendered to the effect that the points Q(i,j−1), Q(i,j) lie on different sides in relation to the first curved surface 101.

(i) If the points lie on the same side, then the processor 202 stores the coordinates of point Q(i,j) in the curved surface memory 206.

(j) If the points do not lie on the same side, then the processor 202 stores the coordinates of point S(i,j) in the curved surface memory 206.

(k) The processor 202 then increments j by the operation j+1→j (m) Next, the processor checks whether j=M holds. If j≠M is found to hold, then the processing from step (d) onward is repeated.

(n) If the decision rendered in step (m) is that j=M holds, then the processor 202 increments i by the operation i+1→i (o) Next, a check is performed to determine whether i=N holds.

(p) If i≠N is found to hold, then the operation 0→j is performed and processing is repeated from step (d) onward. If i=N is found to hold by the check performed in step (o), processing for creating the complex curved surface ends.

Figure 5:
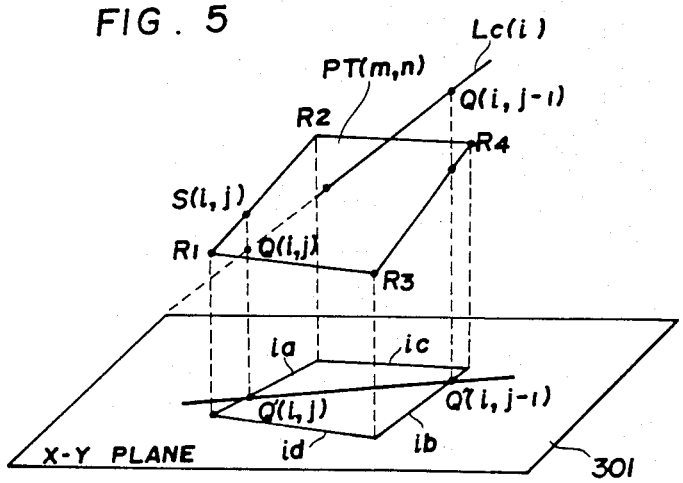
FIGS. 5 and 6 are views for describing processing.

FIG. 5 is a view for describing a method of calculating a point on the first curve having the coordinates (x,y) on the X-Y plane 301. The patch PT(m,n) is a patch on the first curved surface 101, and the curve $L_c(i)$ is a curve on the curved surface 102.

If a projection point Q'(i,j) (i=1, 2, 3, ...) obtained by projecting the point Q(i,j) (j=1, 2, 3, ...) on curve $L_c$ onto the X-Y plane lies on any of the projected sides $i_a, i_b, i_c, i_d$ of patch PT(m,n) on the X-Y plane, then the Z coordinate of point S(i,j) on the first curved surface 101 having the same coordinates (x,y) as the projection point Q'(i,j) is calculated by a proportional distribution in accordance with the following equation, where the coordinates values of the points $R_1$-$R_4$ at the corners of the patch PT(m,n) are assumed to be $(x_i, y_i, z_i)$ ($i = 1, 2, 3, 4$).

$$z = zl + (z2 - zl)\cdot(x - xl)/(x2 - xl) \quad (1)$$

or $$z = zl + (z2 - zl)\cdot(y - yl)/(y2 - yl) \quad (2)$$

Accordingly, if the curves $L_c(i)$, $L_r(j)$ on the curved surfaces 101, 102 are decided in such a manner that the projected point Q(i,j) arrives on a projected side of the patch, the Z coordinate of the point S(i,j) can be obtained in accordance with Eqs. (1), (2).

Figure 6:
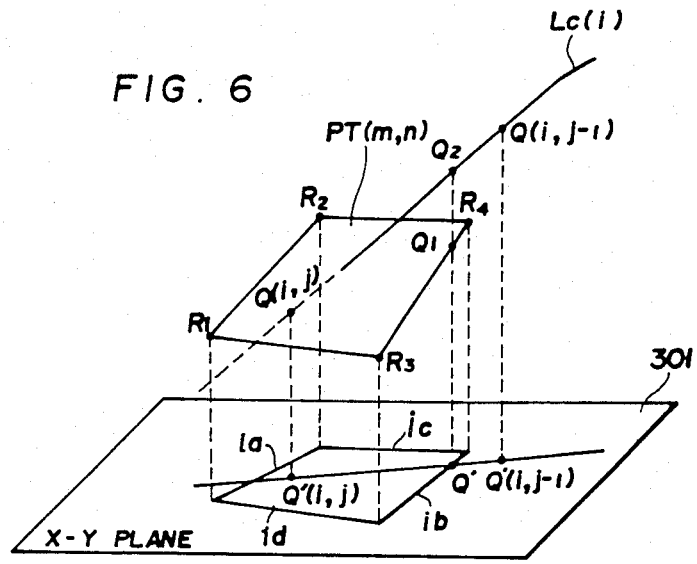

If the projected point Q'(i,j) does not lie on a projected side of the patch, as shown in FIG. 6, the coordinates (x',y') are found of a point Q' where a straight line connecting the projected points Q'(i,j−1) and Q'(i,j) on the X-Y plane intersects any of the projected sides $i_a$, $i_b$, $i_c$, $i_d$. The Z coordinates of points Q1, Q2 on the first and second curved surfaces corresponding to the point Q' are obtained by using Eqs. (1), (2). The Z coordinates of Q1, Q2 are compared in magnitude and the coordinates of either Q1 or Q2, depending upon the magnitudes thereof, are stored.

Figure 8B:
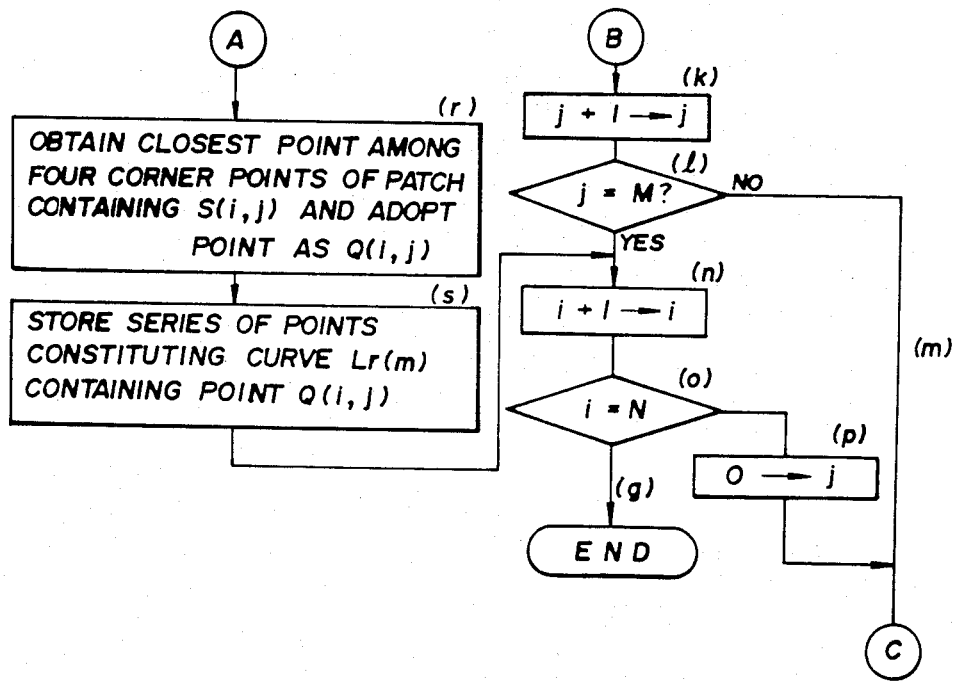
Figure 7:
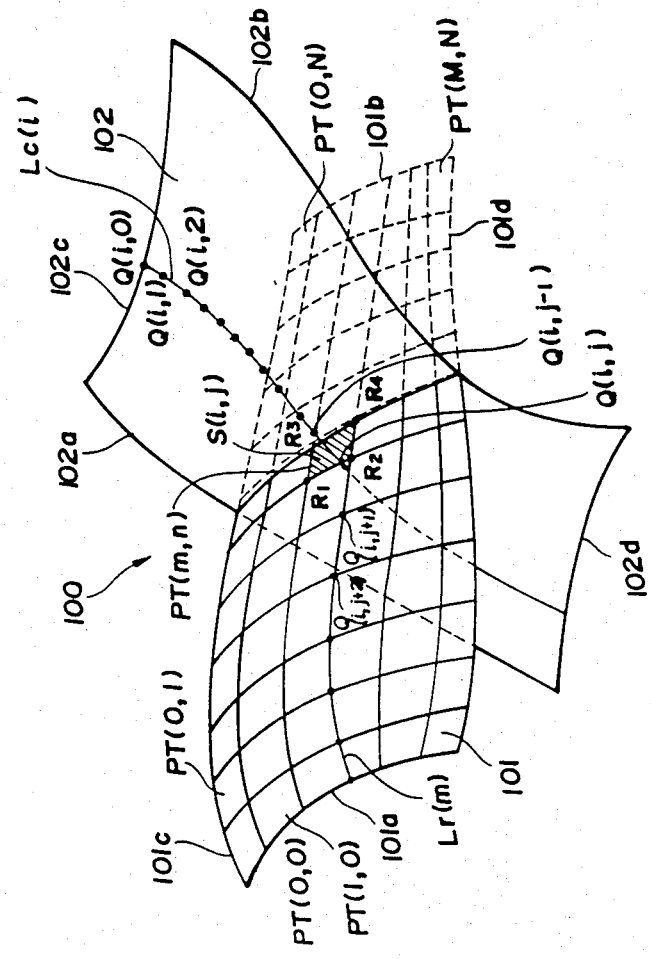
FIG. 7 is a view for describing the general features of another aspect of the invention.

FIG. 7 is a view for describing the general features of complex curved surface creation in another aspect of the invention, and FIG. 8 is a flowchart of processing. In the flowchart of FIG. 8, processing up to step (g) is identical with processing up to step (g) in the flowchart of FIG. 3 and therefore will not be described. Processing from step (h) onward will be explained.

(h) The processor 202 determines whether the size relationship between the Z coordinate $ZQ_j$ of point Q(i,j) and the Z coordinate $ZS_j$ of point S(i,j) coincides with the size relationship between the Z coordinate $ZQ_{j-}$ of point Q(i,j−1) and the Z coordinate $ZS_{j-1}$ of point S(i,j−1).

(k) If $ZQ_j \geq ZS_j$, $zQ_{j-1} \geq zS_{j-1}$ or $ZQ_j < ZS_j$, $ZQ_{j-1} < ZS_{j-1}$ hold, then the points Q(i,j−1), Q(i,j)j lie on the same side in relation to the first curved surface 101. Accordingly, the processor 202 updates j by performing the operation $$j + 1 \rightarrow j$$

(1) Next, the processor checks whether j=M holds.

(m) If j≠M is found to hold, then the processing from step (d) onward is repeated using the new j.

(n) If the decision rendered in step (1) is that j=M holds, then the processor 202 increments i by the operation $$i + 1 \rightarrow i$$

(o) Next, a check is performed to determine whether i=N holds.

(p) If i≠N is found to hold, then the operation 0→j is performed and processing is repeated from step (d) onward using the new i and j.

(q) If i=N is found to hold by the check performed in step (o), processing for creating the complex curved surface ends.

(r) If the result of the decision rendered in step (h) is that $ZQ_j \geq ZS_j$, $zQ_{j-1} < ZS_{j-1}$ or $ZQ_j < ZS_j$, $ZQ_{j-1} \geq ZS_{j-1}$ hold, then the points Q(i,j), Q(i,j−1), lie on different sides in relation to the first curved surface 101. Accordingly, the processor performs the following processing: Specifically, among the points R1-R4 at the four corners of the patch PT(m,n) containing the point S(i,j), a point Ri that is on the upper side of the curved surface 102 and closest to the point S(i,j) is obtained, and this point is made the new Q(i,j).

(s) Thereafter, the processor 202 obtains a curve $L_r(m)$ on curved surface 101 containing the point Q(i,j) and, among the series of points constituting the curve $L_r(m)$, successively stores points on the left side (in the example of FIG. 7) of curve $L_r(m)$ in RAM 204 as Q(i,j), Q(i,j+1), Q(i,j+1) . . . and so on,.

The processor 202 follows this by repeating processing from step (n) onward.

Thus, the complex curved surface 100 is generated in the form of the set of points Q(i,j) (i=1, 2, 3 . . . , j = 1, 2, 3 . . . ).

In the complex curved surface creation processing for the case described above, the curved surfaces 101, 102 are combined via a single boundary line. However, in a case where the curved surfaces are combined via two or more boundary lines, it is necessary to create the complex curved surface by executing the same processing after making a transfer from curved surface 102 to curved surface 101.

Thus, in accordance with the present invention as described above, a complex curved surface composed of at least two three-dimensional curved surfaces can be created in accurate fashion. As a result, the invention is well-suited for application to an apparatus for creating an NC tape for a metal mold or the like.

We claim:

1. A method of creating a complex curved machining surface by combining at least first and second three-dimensional curved machining surfaces, comprising:

inputting data for specifying first and second three-dimensional curved machining surfaces;

obtaining position data indicative of a j-th point Q(i,j) along an i-th path, the i-th path passing through the first three-dimensional curved machining surface and having a first side on one side of the first three-dimensional curved machining surface and a first side on the other side of the second three-dimensional curved machining surface, where the second three-dimensional curved machining surface is defined by a set of plural paths generated in dependence upon said data;

determining, with regard to the first three-dimensional curved machining surface, whether the point Q(i,j) is on a same side of the first three dimensional curved machining surface as a (j−1)th point Q(i, j−1) along said i-th path;

storing the point Q(i,j) if it is on the same side and, if it is not on the same side, obtaining and storing the coordinates of a point S(i,j) on the first three-dimensional curved machining surface corresponding to a projected point obtained by projecting the point Q(i,j) on a predetermined plane;

performing the operation j=j+1, obtaining position data indicative of the next point Q(i,j) on the i-th path, performing said steps of determining and storing, and obtaining a point on the complex curved machining surface corresponding to the i-th path; and machining the complex curved machining surface.

2. A method of creating a complex curved machining surface according to claim 1, wherein said step of determining includes:

obtaining coordinates of the point S(i,j) on the first three-dimensional curved machining surface corresponding to a projected point obtained by projecting the point Q(i,j) on the predetermined plane, and comparing, in terms of magnitude, the coordinate of the point S(i,j) in a height direction perpendicular to the predetermined plane and the coordinate of the point Q(i,j) in the height direction.

3. A method of creating a complex curved machining surface by combining at least first and second three-dimensional curved maching surfaces, comprising:

inputting first and second data for specifying first and second three-dimensional curved machining surfaces;

dividing the first three-dimensional curved machining surface into a number of patches, each of which comprises a minute quadrilateral, independence upon said first data;

obtaining position data indicative of a j-th point Q(i,j) along an i-th path, the i-th path passing through the first three-dimensional curved machining surface and having a first line side on one side of the first three-dimensional curved machining surface and a second line side on the other side of the first three-dimensional curved maching surface, where the second three-dimensional curved machining surface is defined by a set of plural paths generated using said second data;

determining, with regard to the first three-dimensional curved machining surface, whether the point Q(i,j) is on a same line side of the first three-dimensional curved machining surface as a (j−1)th point Q(i,j−1) along said i-th path;

if the point Q(i,j) is on the same side, performing the operation j=j+1, obtaining position data indicative of the next point Q(i,j) on the i-th path, and performing the step of determining;

if the point Q(i,j) is not on the same side as the point Q(i,j−1), obtaining a predetermined point R(i,j) on a patch side with regard to the second curved machining surface of a patch defined by points at four corners of said patch intersected by a straight line connecting the points Q(i, j−1), Q(i,j), when the line side of the point Q(i, j−1) is assumed to the patch side with regard to the first curved machining surface;

adopting the point R(i,j) as a boundary point of the complex curved surface on the first curved machining surface, and adopting the point Q(i,j−1) as boundary point of the complex curved surface on the second curved machining surface; and machining the complex curved machining surface.

4. A method of creating a complex curved machining surface according to claim 3, wherein said step of determining whether the point Q(i,j−1) and the point Q(i,j) are on the same line side includes:

obtaining coordinates of a point S(i,j) on the first three-dimensional curved machining surface corresponding to a projected point obtained by projecting the point Q(i,j) on a predetermined plane, and discriminating, in terms of magnitude, the point S(i,j) and the point Q(i,j) in a height direction perpendicular to the predetermined plane.

5. A method of creating a complex curved machining surface according to claim 4, wherein said predetermined plane is an X-Y plane and said height direction is a direction along a Z axis.

6. A method of creating a complex curved machining surface according to claim 5, further comprising projecting the patch surrounding said projected point on the X-Y plane, and calculating a Z coordinate of the point S(i,j) on the first three-dimensional curved machining surface having an X-Y plane coordinate of said projected point by using the coordinate of the projected point on the X-Y plane and three-dimensional coordinates of points at four corners of said patch.

7. A method of creating a complex curved machining surface according to claim 6, wherein among the points at the four corners of said patch, a point on the patch side with respect to the second three-dimensional curved surface and closest to the point S(i,j) is adopted as said point R(i,j).

* * * * *

UNITED STATES PATENT AND TRADEMARK OFFICE
CERTIFICATE OF CORRECTION

PATENT NO. : 4,855,921

DATED : August 8, 1989

INVENTOR(S) : Seiki et al.

It is certified that error appears in the above-identified patent and that said Letters Patent is hereby corrected as shown below:

Col. 4, line 68, "$R_{1-R4}$" s/b --$R_1-R_4$--.

Col. 5, line 36, "$ZQ_j$-" s/b --$ZQ_{j-1}$--;

line 64, "$zQj-1$" s/b --$ZQ_{j-1}$--.

Signed and Sealed this

Fourteenth Day of August, 1990

Attest:

HARRY F. MANBECK, JR.

Attesting Officer      Commissioner of Patents and Trademarks